United States Patent [19]
Kipp et al.

[11] 4,145,640
[45] Mar. 20, 1979

[54] ELECTRIC CART DRIVE CONTROL SYSTEM

[75] Inventors: Dieter Kipp, Vaihingen; Herbert Aman, Aich; Rudolf Hansen, Freising, all of Fed. Rep. of Germany

[73] Assignee: Robert Bosch GmbH, Stuttgart, Fed. Rep. of Germany

[21] Appl. No.: 852,465

[22] Filed: Nov. 17, 1977

[30] Foreign Application Priority Data

Dec. 21, 1976 [DE] Fed. Rep. of Germany ....... 2657920

[51] Int. Cl.² ............................................... H02P 7/28
[52] U.S. Cl. .................................... 318/139; 318/257; 318/293; 318/345 G
[58] Field of Search ............... 318/139, 247, 257, 258, 318/267, 291, 293, 296–298, 341, 345, 351, 353, 426, 526, 527

[56] References Cited

U.S. PATENT DOCUMENTS

| | | | |
|---|---|---|---|
| 3,127,549 | 3/1964 | Smith | 318/298 |
| 3,549,971 | 12/1970 | Van Patten et al. | 318/293 |
| 3,716,768 | 2/1973 | Mason | 318/293 X |
| 3,751,677 | 8/1973 | Gurwicz | 318/345 G |
| 3,866,100 | 2/1975 | Palenchar et al. | 318/257 |
| 4,054,817 | 10/1977 | Gurwicz et al. | 318/139 X |

Primary Examiner—Robert K. Schaefer
Assistant Examiner—W. E. Duncanson, Jr.
Attorney, Agent, or Firm—Flynn & Frishauf

[57] ABSTRACT

Variable pulsing of a dc source without change of polarity is used for lossless control of the speed of a compound dc motor. The pulsed dc supply is fed in series through the series field winding, armature and reversing switch system and the shunt field winding has one terminal connected to the pulsed dc source and its other terminal connected respectively through two conductively poled diodes to the opposite terminals of the armature winding. Two anti-kickback devices are also provided, one of which operates during reverse-current braking. The reversing switch system has two independently actuatable single-pole double-throw switches of which the respective arm contacts are connected to the ends of the armature winding, one fixed contact of each of these reversing switches being connected to the series field winding and the other pair, likewise connected together, being connected to one terminal of the dc supply. Whenever the reversing switches are connected to fixed contacts that are connected together, the motor is turned off and the pulsing control SCR is necessarily extinguished. To turn the motor on, one of the reversing switches is thrown, the one selected determining the direction of operation of the motor to produce braking or to reverse the direction of operation, both reversing switches are thrown simultaneously. To stop energization of the motor, one of them is thrown.

6 Claims, 1 Drawing Figure

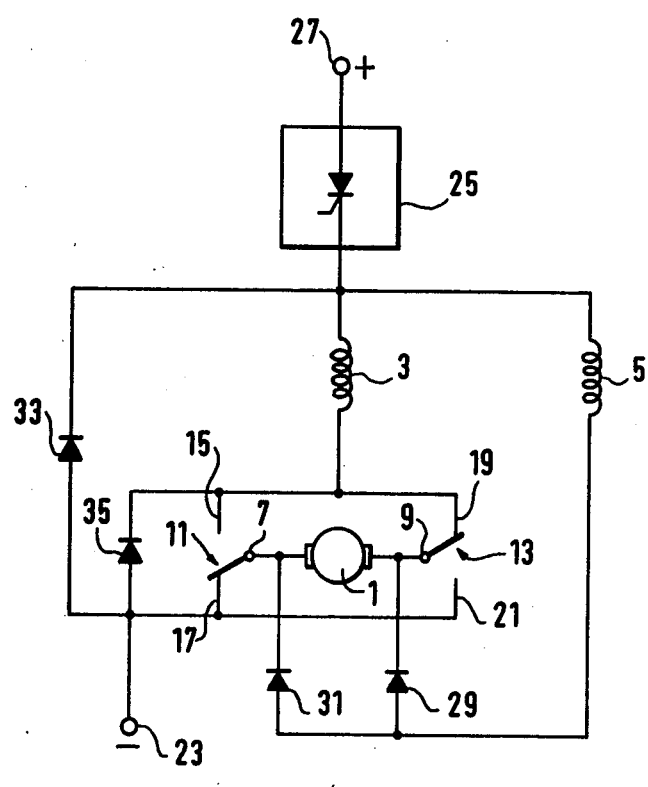

ELECTRIC CART DRIVE CONTROL SYSTEM

This invention relates to a control system, particularly a system for starting, stopping and reversing the drive motor of an electrically driven ambulatory cart, such carts being commonly called go-carts, which is designed to be operated by a user or operator who walks alongside it. Such go-carts are used for carrying small loads around warehouses or manufacturing plants and sometimes outdoors, where a heavier vehicle that would carry the driver also would be too bulky or uneconomical. Such walk-along carts are commonly driven by a dc electric motor supplied with energy by a storage battery carried along on the cart. They can be equipped with a motor speed control by which the velocity of travel of the cart can be matched to the walking speed of the user.

For transport equipment of this kind, series-wound dc motors are most commonly used, because their rate of revolution slows down with increasing load. Such motors, moreover, develop their full torque even as the storage battery voltage diminishes towards that of the discharged state. Such motors have the disadvantage, however, of the strong dependence of the torque on the rate of revolution of the motor, particularly at low loads, a feature that makes more difficult the control of the velocity of travel of the cart.

THE PRESENT INVENTION

It is an object of the present invention to provide a reliable and nevertheless simple drive for an electrically driven cart that makes possible a smooth and even control of the velocity of travel of the cart, and in particular that makes possible both braking and acceleration, as well as reversal of direction.

Briefly, the speed control for the motor is provided by the interposition between the battery and the motor of a dc pulsing circuit utilizing at least one semiconductor controlled rectifier to chop the dc supplied to the motor, so that the speed control and the battery together operate as a source of variably pulsed dc voltage of constant polarity, the pulsing being adjustable in pulse width and/or frequency, and the motor is constituted as a compound-wound dc motor having its armature winding connected in series with reversing switch means and the series field winding and having its shunt field winding connected at one end through a pair of diodes to both terminals of the armature winding, the diodes being poled in the conduction direction for the dc pulses of the pulsed voltage source. The controlled variable pulsing of the battery voltage by the thyristor (SCR) arrangement provides a substantially loss-free control of the speed of the motor and, hence, of the travel velocity of the cart. Since the motor is constituted as a compound dc motor, its rotary speed, when the cart is driven with little or no load, is effectively limited. Compared with carts driven by a series-wound motor, the travel velocity of a cart driven according to the invention falls off less strongly with increasing load.

The armature winding can be reversed with the reversing switch system, so that the cart can be driven either forwards or backwards and, when driven in either direction, the cart can be braked by energizing the motor in the reverse direction.

As is known, a semiconductor controlled rectifier (also called "thyristor" or "(SCR)"), once it is fired (turned on), can be extinguished (returned to its non-conducting condition) only by the stopping, at least for a moment, of the current flowing through it. In order not to lose control of the cart by a faulty operation of the SCR control, it would be necessary to insert a supplementary emergency switch into the circuit of the current flowing through the SCR, or else the cart must be switched off by the main or final switch located in the control head or driving pedal. According to the invention, the reversing switch means interrupts the current through the SCR whenever the control switch is in a normal manner moved from "drive" to the neutral position (which may be designated "out") or over to the "brake" position, this last designating the reversing of the direction of energization of the motor. The reason why these normal operations of the control and reversing switch system extinguish the SCR is that the reversing switch system interrupts both the current through the series field winding and also the current through the shunt field winding momentarily, in being switched over. In order to be used for stopping and starting, a reversing switch would have to have a neutral position, but for such a reversing switch two individual two-position switches can be substituted or for such two reversing switches, there can be substituted four gates. Because of the variety of devices that can be used, it is convenient to refer to a reversing switch system rather than simply to a reversing switch.

The electric drive cart can, accordingly, be switched off by use of the drive control switch even when the SCR speed control system fails to be turned off in any other way. This is important, because such a failure of the SCR control would apply maximum power to the motor.

Preferably a diode poled in the blocking direction for the pulsed dc voltage is connected in parallel to the series combination of the series field winding, the armature winding and the reversing switch system. This diode operates as a so-called free-running diode or anti-kickback diode. It not only cuts off the reverse voltage peaks, but it takes over the generator-effect current produced by the motor during the interpulse intervals of the SCR-controlled dc supply. This anti-kickback diode can also be built into the SCR voltage control circuit, rather than into the motor switching circuit. Corresponding to the anti-kickback diode, it is useful for another diode likewise poled in the blocking direction for the pulsed dc supply voltage to be connected in parallel to the series combination of the armature winding and the reversing switch system, this diode being accordingly conveniently referred to as the armature diode. The armature diode takes over the function of the anti-kickback diode during braking, because dc current pulses are also supplied from the pulsed voltage source for braking.

A simple reversing switch system suitable for the supplementary function is provided when two reversing switches are used having their movable or arm contacts respectively connected to opposite terminals of the armature winding, each switch having its fixed contact respectively connected to the fixed contacts of the other switch. In order to reverse the direction of rotation of the motor and thereby the direction of travel of the cart, both reversing switches must be switched from their previous position to their other position. Preferably, the reversing switches are, nevertheless, separately actuatable. In this manner, it is possible to save the expense of a main switch for the motor current, since the SCR current circuit is interrupted whenever the movable contacts of the two reversing switches are respectively connected to fixed contacts that are connected together.

Such a reversing switch system, cooperating with the manner of connection of the shunt field winding above explained, makes quite unnecessary the provision of any supplementary switch contacts for turning off the shunt wound field. If the shunt field winding were connected ahead of the variable pulsing speed control, that is, directly to the battery, the shunt field would brake the motor in the idling position of the switches. Such an effect on the driving characteristics can be avoided if, as here, both the series field winding and also the shunt field winding are switched off in the idling position. It should be mentioned here, that for the purposes of the contacts above described, gate devices may be used that are controlled by actuation of supplementary switches in conventional ways, as by use of relays, semi-conductor devices and so on. It will also be understood that in a double-throw switch, the movable contact may be referred to as the selecting contact or the transfer contact, and the fixed contact may be referred to as the selected contact, or the like, the matter of movement being of course relative, but the most conventional form being generally referred to in the terminology.

Drawing, illustrating an example.

FIG. 1 is a circuit diagram, partly in block form, of a preferred illustrative embodiment of an electric drive control system according to the invention.

The drive shown in FIG. 1 uses a compound dc motor having an armature winding 1, a series field winding 3 and a shunt field winding 5. In order to enable reversal of the direction of rotation of the compound dc motor, the armature winding 1 is connected between the respective movable contacts 7 and 9 of two reversing switches 11 and 13 of a reversing switch system. The reversing switches 11 and 13 each have two fixed contacts 15,17 and 19,21, each connected to a fixed contact of the other switch, so that the fixed contacts are connected together in pairs. The fixed contacts 15 and 19 are connected to one terminal of the series field winding 3; the fixed contacts 17 and 21 are connected to a terminal 23 connected to the negative pole of a dc current and voltage source. The other terminal of the series field winding 3 is connected through the SCR switching path of an SCR pulsing voltage control circuit 25 to a terminal 27 that is connected to the positive pole of the current and voltage source. This last-mentioned terminal of the series field winding 3 is also connected with one terminal of the shunt field winding 5, while the other terminal of the shunt field winding 5 is connected through a pair of diodes 29,31 both poled in the conduction direction for the current furnished through the SCR switching path of the SCR voltage control circuit 25 respectively to the two terminals of the armature winding 1.

The SCR pulsing control circuit 25 provides dc pulses of constant polarity which are adjustable in a manner not further shown in FIG. 1 in pulse width and/or pulse sequence frequency for control of the motor speed and hence of the travel speed of the cart. The particular manner of control of the motor speed by variation of the pulsing is not a part of the invention and for this reason, the circuit 25 is shown simply in block form. The dc pulses provided through the pulsing circuit 25 with always the same polarity will drive or brake the cart according to the direction of movement and the polarity of the armature winding 1 at the particular time.

An anti-kickback diode 33 is connected in parallel to the series combination of the series field winding 3, the armature winding 1 and the reversing switch system, this diode 33 serving not only to knock down the voltage peaks produced by the inductance of the shunt field winding 5, but also to take up the generator-effect current produced by the motor in the interpulse intervals of the pulsing control circuit 25. An armature diode 35 is also connected in parallel to the series combination of the armature winding 1 and the reversing switch system, this diode 35 taking over the function of the anti-kickback diode 33 during braking.

The reversing switches 11 and 13 are separately actuatable. The drive is switched off when the movable contacts 7 and 9 are connected respectively to fixed contacts that are connected to each other, thus to the contacts 15 and 19 or to the contacts 17 and 21. In these positions, the current flow circuits of the SCR switching paths of the pulsing control circuit 25 is interrupted, so that even in the case of malfunction of the pulsing control circuit 25 conducting SCR's can be extinguished. If the cart is to be moved, then, according to the desired direction of travel, one of the two reversing switches 11 and 13 is switched over. For braking the movement or reversing the direction of travel, both reversing switches 11 and 13 are thrown together.

The SCR pulsing control circuit 25 is a circuit already for itself known and is described for example in U.S. Pat. Nos.: 3,500,161, 3,517,290, 3,735,220.

We claim:

1. An electric cart drive control system comprising an electric driving motor having both a series field winding (3) and a shunt field winding (5) as well as an armature winding (1) and a source (25) of variably pulsed dc voltage of constant polarity, including at least one semiconductor controlled rectifier (thyristor), for controlling the speed of and energizing said motor, said control system further comprising:

switch means (11,13) for reversing said motor, through which means said armature winding is connected to said series field winding (3) and in circuit with said pulse voltage source (25) for each direction of operation of said motor, and diodes (29,31) having their like terminals connected to the same end of said shunt field winding (5) respectively interposed between said end of said shunt field winding and the two ends of said armature winding (1), the other end of said shunt field winding being connected to said pulse voltage source (25), said diodes being poled for conduction of current from said source.

2. An electric drive control system as defined in claim 1, in which a diode (33) poled in the blocking direction for the voltage pulses produced by said source (25) is connected in parallel to the series combination of said series field winding, said armature winding and said reversing switch means (11,13).

3. An electric drive system as defined in claim 1, in which a diode (35) poled in the blocking direction for the pulse voltage produced by said source (25) is connected in parallel with the series combination of said armature winding (1) and said reversing switch means (11,13).

4. An electric drive system as defined in claim 1, in which said reversing switch means (11,13) comprises two double-throw switches the respective movable contacts of which are connected to the two ends of said armature winding (1), each of said switches having a pair of fixed contacts of which each is connected to a different one of the fixed contacts of the other of said double-throw switches.

5. An electric drive system as defined in claim 4, in which each of said double-throw switches (11,13) is separately actuatable, whereby said reversing switch means is also usable for stopping and starting said motor and for extinguishing said semiconductor controlled rectifier (thyristor) in the event of malfunction thereof.

6. An electric drive system as defined in claim 1, in which a third diode, poled in the blocking direction for the pulse dc voltage produced by said source (25) is connected in parallel to the series combination of said series field winding (3), said armature winding (1) and said reversing switch means (11,13), in which, further, a fourth diode (35) likewise poled in the blocking direction for said pulse voltage produced by said source (25) is connected in parallel with the series combination of said armature winding (1) and said reversing switch means (11,13) and in which, further, said reversing switch means comprises a pair of independently actuatable double-throw switches of which the respective movable or selecting contacts (7,9) are connected to the respective ends of said armature winding (1) and of which the remaining or selected contacts (15,17 and 19,21) are connected pairwise to a contact of the other double-throw switch.

* * * * *